United States Patent
Vernon et al.

(10) Patent No.: US 6,233,718 B1
(45) Date of Patent: May 15, 2001

(54) AVOIDING FORBIDDEN DATA PATTERNS IN CODED AUDIO DATA

(75) Inventors: Stephen Decker Vernon, San Francisco; Louis Dunn Fielder, Millbrae; Mark Franklin Davis, Facifica, all of CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 09/175,090

(22) Filed: Oct. 19, 1998

(51) Int. Cl.[7] .................................................. G06F 11/00
(52) U.S. Cl. ............................................. 714/811; 714/746
(58) Field of Search .................................. 714/811, 701, 714/746; 341/55

(56) References Cited

U.S. PATENT DOCUMENTS

| | | | |
|---|---|---|---|
| 3,878,331 | 4/1975 | Morgan et al. ........................ 178/22 |
| 5,339,400 | * 8/1994 | Iijima ................................... 711/115 |
| 5,473,328 | 12/1995 | Asato ..................................... 341/55 |
| 5,640,161 | * 6/1997 | Johnson et al. ...................... 341/122 |
| 5,644,569 | 7/1997 | Walker ................................ 370/473 |
| 5,696,505 | 12/1997 | Schouhamar Immink ............ 341/59 |

FOREIGN PATENT DOCUMENTS

| | | |
|---|---|---|
| 2439444 | 5/1980 | (FR) . |
| WO91 16778 | 10/1991 | (WO) . |
| WO96 21984 | 7/1996 | (WO) . |
| WO99 33268 | 7/1999 | (WO) . |

* cited by examiner

*Primary Examiner*—Phung M. Chung
(74) *Attorney, Agent, or Firm*—Gallagher & Lathrop; David N. Lathrop; Thomas A. Gallagher (57) ABSTRACT

Any of several information processing techniques may be used in various information storage and transmission applications to prevent the occurrence of certain "forbidden" bit patterns. According to an encoding technique, a reversible coding process is used to generate an encoded representation of an information stream that cannot contain any forbidden data patterns. This may be accomplished by partitioning the information stream into segments and encoding each segment according to a respective encoding key that is selected such that the results of the coding process cannot contain a forbidden data pattern. According to one substitution technique, all occurrences of forbidden data patterns are replaced with permissible data patterns that do not otherwise occur in the information stream. This may be accomplished by partitioning the information stream into segments, identifying an unused data pattern in a respective segment, and carrying out the replacement of all occurrences of the forbidden data pattern in that segment. According to another substitution technique, all occurrences of a forbidden data pattern are replaced by any permissible data pattern. This may be accomplished by partitioning the information stream into segments, identifying occurrences of the substitution data pattern and the forbidden data pattern in a respective segment, constructing a flag for each occurrence, and replacing all occurrences of the forbidden data pattern in that segment with the substitution data pattern. Decoding keys, substitution data patterns, substitution flags or any other information needed to recover the original information is assembled with the modified information in a form that does not equal the forbidden data pattern.

54 Claims, 3 Drawing Sheets

AVOIDING FORBIDDEN DATA PATTERNS IN CODED AUDIO DATA

TECHNICAL FIELD

The present invention relates to processing information such as audio or video information. In particular, the present invention relates to processing information to avoid or prevent the occurrence of unwanted or forbidden data patterns.

BACKGROUND ART

In applications that create, store or transmit information, it may be desirable to designate certain bit patterns as "forbidden" such that these patterns do not occur in a stream of digital words conveying the information. One example is found in systems that use a "sync" pattern to mark the boundary of a frame or packet of information in a data stream. The sync pattern is used to align or synchronize equipment that is intended to process the frame or packet of information. In such cases, it can be useful to prevent the sync pattern from occurring in the data stream itself so that information within the data stream cannot be falsely identified as a sync pattern.

Another example arises in the field of digital audio transport. The serial transmission of digital audio information is the subject of various international standards such as AES3 (ANSI S4.40) published by the Audio Engineering Society (AES). This standard defines serial transmission of two-channel digital audio represented in a linear pulse code modulation (PCM) form. According to this standard, PCM samples for two channels are interleaved and conveyed in pairs. In the case of 16-bit PCM that is expressed in two's complement representation, these amplitude values can vary within a range from 32767 (expressed in hexadecimal notation as 0x7FFF) through −32768 (0x8000). In this representation, a slight amount of asymmetry is introduced by virtue of the most-negative value being one unit of magnitude larger than the most-positive value.

Some equipment is designed to prevent this asymmetry by avoiding the most-negative value of 0x8000. If this value is not used for conveying PCM amplitude, it can be and sometimes is used for some other purpose such as conveying control or signaling information. If a PCM sample having this value does occur in the audio information, it could be incorrectly identified as control or signaling information; therefore, this particular data pattern should be avoided in the audio information. This can be accomplished by replacing the forbidden value of −32768 (0x8000) with another value such as −32767 (0x8001). This substitution introduces an irreversible error in the audio information but, for PCM audio information, the error is insignificant.

A problem arises when the information is not PCM audio samples but is a digital bit stream that represents audio information in an encoded form. Two examples of such bit streams are those conforming to Dolby AC-3 and various ISO MPEG standards. In such cases, substituting one value such as 0x8001 for another value such as 0x8000 almost certainly represents an audible change in the audio information and, because this substitution cannot be reversed, will cause unacceptable distortion in the recovered audio information.

This problem is significant because there is a growing interest to use equipment originally designed for one- or two-channel PCM bit streams such as AES3-compatible bit streams to convey more audio channels in an encoded form such as the AC-3 and MPEG forms mentioned above. One the one hand, these encoded forms can include forbidden data patterns that are not conveyed correctly because the forbidden data patterns are incorrectly interpreted as control or signaling information. On the other hand, known substitution methods for avoiding these forbidden data patterns introduce irreversible changes in the encoded information that cause audible distortion in recovered audio.

This problem can be solved by preventing the occurrence of forbidden data patterns in the encoded audio information. One way to accomplish this is to put the encoded audio information in a form that ensures all forbidden data patterns are avoided. For example, the digital audio information can be parsed into a sequence of n-bit words and each word converted into longer m-bit codes that can be guaranteed to avoid specific forbidden data patterns. The m-bit codes can be conveyed without difficulty because they do not include any forbidden data patterns. The original encoded audio information can be recovered by converting each m-bit code into an appropriate n-bit word. Many suitable n-to-m bit coding schemes are known. The problem with this approach is that it requires an overhead of (m−n) bits per word. In many applications, this overhead imposes storage capacity requirements or channel bandwidth requirements that are difficult if not impossible to satisfy.

Another way to prevent the occurrence of forbidden data patterns in encoded audio information is to design the syntax of the encoded stream to avoid generating a forbidden data pattern. For example, the value 0x8000 could be avoided by ensuring the encoded stream never contains more than fourteen consecutive zero-bits because this forbidden data pattern consists of fifteen zero-bits following a single one-bit. The problem with this approach is that it imposes restrictions on the elementary bitstream syntax that must be considered at every stage of the encoding process. Furthermore, this approach may impose extremely complex restrictions on the syntax if more than one forbidden data pattern is to be avoided.

DISCLOSURE OF INVENTION

It is an object of the present invention to provide an efficient way to avoid one or more forbidden data patterns in digital information streams such as encoded digital audio or digital video data streams. This object may be achieved by the present invention as set forth below in the independent claims. Various advantageous embodiments are set forth below in the dependent claims.

According to one aspect of the present invention, information is processed to avoid forbidden data patterns by receiving a segment of the information that comprises digital words, obtaining an encoding key to control an encoding process, wherein the encoding key is such that the encoding process applied to each digital word in the segment produces a result that is unequal to the forbidden data pattern, applying the encoding process to the digital words in the segment to generate encoded information, wherein the encoding process is applied in a manner controlled by the encoding key, and assembling key information and the encoded information into a form that is suitable for transmission or storage, wherein the key information is unequal to the forbidden data pattern and is such that a decoding key for a decoding process complementary to the encoding process may be obtained therefrom.

According to another aspect of the present invention, information is processed to recover original information including forbidden data patterns by receiving a segment of information that comprises digital words and extracting therefrom a decoding key to control a decoding process, applying the decoding process to the digital words in the segment to generate decoded information, wherein the decoding process is applied in a manner controlled by the decoding key to recover one or more digital words having the forbidden data pattern, and generating an output signal from the decoded information.

According to another aspect of the present invention, information is processed to avoid forbidden data patterns by receiving a segment of the information that comprises digital words, obtaining a substitution data pattern that is unequal to the forbidden data pattern and does not occur in the segment, replacing each digital word in the segment having the forbidden data pattern with a substitute digital word having the substitution data pattern, and assembling the substitution data pattern and the segment with substitute digital words into a form that is suitable for transmission or storage.

According to another aspect of the present invention, information is processed to recover original information including forbidden data patterns by receiving a segment of information that comprises digital words and extracting therefrom a substitution data pattern, replacing each digital word in the segment having the substitution data pattern with a substitute digital word having the forbidden data pattern, and generating an output signal from the segment with substitute digital words.

According to another aspect of the present invention, information is processed to avoid forbidden data patterns by receiving a segment of the information that comprises digital words, constructing a set of flags, wherein each flag in the set corresponds to a respective digital word in the segment having either the forbidden data pattern or a substitution data pattern, and wherein each flag in the set indicates whether the respective digital word has the forbidden data pattern or the substitution data pattern, replacing each digital word in the segment having the forbidden data pattern with a substitute digital word having the substitution data pattern, and assembling the set of flags and the segment with substitute digital words into a form that is suitable for transmission or storage.

According to another aspect of the present invention, information is processed to recover original information including forbidden data patterns by receiving a segment of information that comprises digital words and extracting therefrom a set of flags, wherein each flag corresponds to a respective digital word in the segment having a substitution data pattern and wherein each flag indicates whether the respective digital word should have the forbidden data pattern or the substitution data pattern, replacing with digital words having the forbidden data pattern those respective digital words in the segment that have the substitution data pattern and that correspond to a respective flag indicating the respective digital word should have the forbidden data pattern, and generating an output signal from the segment with substitute digital words.

According to another aspect of the present invention, information is processed to avoid forbidden data patterns by receiving the information, wherein the information comprises a plurality of digital words, partitioning the information at a location before a digital word having any of the forbidden data patterns to obtain a first segment of digital words prior to the location having no digital word with any forbidden data pattern and a second segment of digital words after the location having one or more digital words with one of the forbidden data patterns, processing the second segment of digital words to obtain a modified segment that contains no digital words with any of the forbidden data patterns, and assembling control information with the modified segment into a form that is suitable for transmission or storage, wherein the control information indicates how the second segment may be recovered from the modified segment.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview

Figure 1:
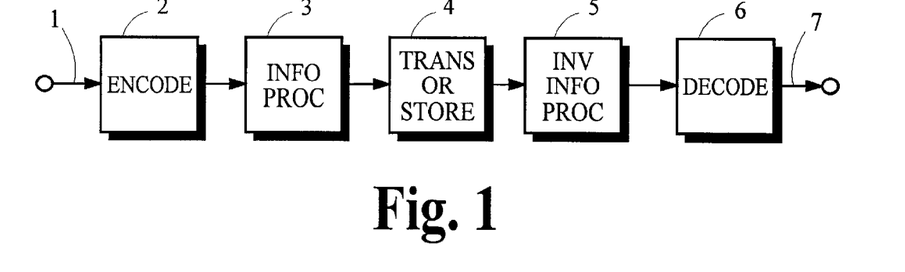
FIG. 1 is a block diagram of an encoding/decoding system that incorporates information processors and inverse information processors according to the present invention.

The present invention may be used in a wide variety of systems that transmit and store digital information such as digital audio and digital video information. The block diagram in FIG. 1 represents major components in such systems. In one example, such a system allows more channels of audio information to be transmitted or stored by apparatuses such as a video cassette recorder (VCR) or a Serial Digital Interface (SDI) embedder that are designed to transmit or store a limited number of channels of PCM audio samples. In this example, component 4 represents apparatuses for transmitting or storing two-channels of audio information conveyed by AES3-compatible signals. These apparatuses operate in a manner that assumes one or more forbidden data patterns do not occur in the information that is to be transmitted or stored.

In this example, encoder 2 receives a signal from path 1 that represents multiple channels of audio information. Encoder 2 processes this signal and generates an encoded digital signal that may contain essentially any data pattern including the one or more forbidden data patterns that component 4 cannot transmit or store correctly. Information processor 3 receives the encoded digital signal from encoder 2 and processes it to avoid any forbidden data patterns that may occur. The resulting encoded information can be properly transmitted or stored by component 4. Inverse information processor 5 subsequently receives the encoded information from component 4 and processes it to recover the encoded digital signal as originally received from encoder 2. The recovered encoded digital signal is passed to decoder 6, which decodes it to recover the multiple channels of audio information that are passed along path 7.

Figure 2:
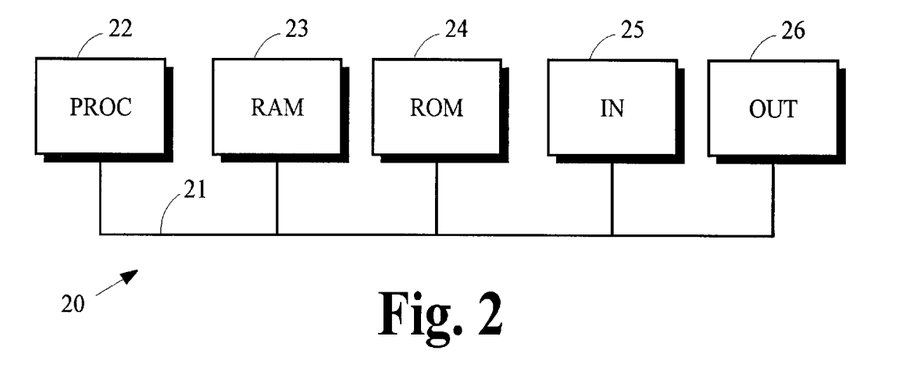
FIG. 2 is a block diagram of a device that can be used to implement information processors and inverse information processors according to various aspects of the present invention.

FIG. 2 is a block diagram of major components in device 20 that can implement various aspects of the present invention. Processor 22, such as a microprocessor, more specialized digital signal processing circuitry or essentially any other form of program-controlled arithmetic unit, executes one or more programs of instructions to carry out various aspects of the present invention. For example, these programs of instructions may be stored in persistent memory such as read-only memory (ROM) 24 or by a storage device such as a disk drive not shown. Work areas or scratch-pad memory may be provided by random access memory (RAM) 23. Input 25 represents one or more components for receiving information to be processed according to the present invention. Output 26 represents one or more components for providing to other devices the results of the processing performed by processor 22. Bus 21, which may represent one or more physical buses, couples these components together.

If the present invention is implemented by one or more programs of instructions, these programs can be embodied in essentially any media such as magnetic tape or disk, optical disc, non-volatile memory chips, or radiation via optical fiber, wire or the air.

The structure of device 20 depicted in the figure is merely one example that may be used to implement aspects of the present invention. For example, a bus architecture is not required. Furthermore, the present invention may be implemented by an application-specific integrated circuit (ASIC). Other implementations are readily apparent.

The present invention may be performed by discrete apparatuses interposed between other apparatuses in a system, as suggested by FIG. 1. Alternatively, some or all of the operations necessary to practice the present invention may be performed within apparatuses such as encoder 2 or component 4.

Encoding Technique

Figure 3:
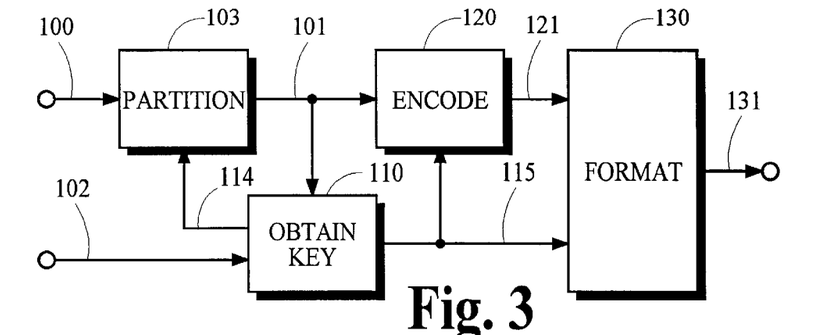
FIG. 3 is a block diagram of an information processor that obtains a key, encodes an information stream according to that key to avoid forbidden data patterns, and assembles the key and the encoded information into encoded information.

FIG. 3 illustrates major components for one embodiment of information processor 3 that avoids forbidden data patterns by using a reversible coding process to generate an encoded representation of an information stream that cannot contain any forbidden data patterns. This may be accomplished by partitioning the information stream into segments and encoding each segment according to a respective encoding key that is selected such that the results of the coding process cannot contain a forbidden data pattern.

Referring to FIG. 3, partition 103 receives an information stream from path 100 and partitions the stream into segments that are passed along path 101. Obtain key 110 analyzes the contents of a respective segment and identifies a suitable encoding key for that segment. An indication of the encoding key is passed along path 115 to encode 120. Encode 120 applies a coding process to the segment according to the encoding key received from path 115 to generate an encoded representation of the segment. Key information, such as a representation of a decoding key or some other information from which a suitable decoding key can be derived, and the encoded representation are passed to format 130, which assembles this information into a form that is suitable for transmission or storage.

The choice of keys is dependent on the characteristics of the process carried out by encode 120. It is anticipated that encode 120 applies a symmetrical coding process, which means the encoding key and the decoding key are identical. Symmetrical coding processes are generally preferred because they can usually be implemented more efficiently. Alternatively, obtain key 110 may identify distinct encode and decode keys. In this case, encode 120 applies an asymmetric coding process according to the encode key and some representation of the decoding key is passed to format 130 for assembly with the encoded representation.

Coding Key

In one embodiment, a symmetric coding process is carried out by performing a bit-wise exclusive-OR between a key K and each digital word $W(i)$ in a segment of the information stream. This coding process can be expressed as $$X(i) = K \oplus W(i). \tag{1}$$

The exclusive-OR operation is symmetric coding process because it is a self-reversing process; that is, for any arbitrary key K, the original word $W(i)$ can be obtained from an encoded word $X(i)$ by applying the exclusive-OR operation with the same key a second time, which can be expressed as $$W(i) = K \oplus X(i) = K \oplus (W(i)). \tag{2}$$

A suitable key K that avoids a forbidden data pattern F in particular segment may be selected for this coding process by identifying a data pattern U that does not occur in any digital word in the segment, and then performing a bit-wise exclusive-OR between the "unused" data pattern U and the forbidden data pattern F. The key K selected in this manner ensures the forbidden data pattern will not occur in the encoded segment. As explained below, if the unused data pattern is constrained to be non-zero, this choice of key also ensures the key itself does not equal the forbidden data pattern.

The operation used to obtain the key can be expressed as $$K = U \oplus F. \tag{3}$$

By substituting this expression for key K into equation 1, the coding process can be rewritten as $$X(i) = K \oplus W(i) = U \oplus F \oplus W(i). \tag{4}$$

It can be proven by contradiction that the coding process of equation 1 using key K obtained in the manner described above avoids the forbidden data pattern F. This may be proven by assuming that, for some value i, the encoded word X(i) equals the forbidden data pattern F. This can be expressed as $$F = X(i) = K \oplus W(i) = U \oplus W(i). \tag{5}$$

Because the exclusive-OR operation is a self-reversing process, the encoded word X(i) can equal the forbidden data pattern only if the original word W(i) equals the unused word U. The original word W(i) cannot equal the unused word, however, because the unused data pattern is defined to be a data pattern that does not occur in a segment. By contradiction, the initial assumption must be false, which proves no encoded word can equal the forbidden data pattern.

If the unused data pattern U equals zero, the key K will equal the forbidden data pattern F because an exclusive-OR between any arbitrary value V and a zero value returns the arbitrary value V. In preferred embodiments, the unused data pattern U is constrained to be non-zero, which prevents the key K itself from being equal to the forbidden data pattern F. If the key were allowed to equal the forbidden data pattern, a modified representation of the key rather than the key itself would have to be provided to format 130 for assembly with the encoded segment to prevent the forbidden data pattern from appearing in the encoded information.

Unused Data Pattern

Figure 4:
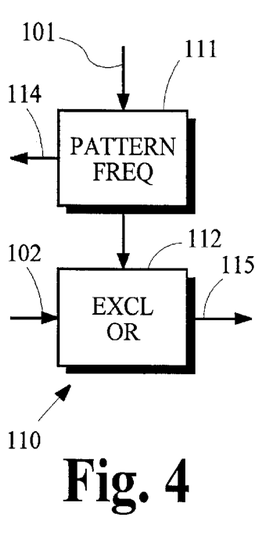
FIG. 4 is a block diagram of a component for obtaining a key that is suitable for use in the information processor of FIG. 3.

One embodiment of a component that can identify an unused data pattern is shown in FIG. 4. Component 111 forms an array that indicates whether particular data patterns occur in the segment, selects a non-zero data pattern U that does not occur in the segment, and passes the unused data pattern to component 112. Component 112 receives the unused data pattern U from component 111, receives the forbidden data pattern F from path 102, and obtains the encoding key K according to equation 3.

One method for finding an unused data pattern begins by constructing an array of elements representing each possible data pattern and initializing each element with the value zero. The contents of each digital word in the segment is examined and, based on these contents, the corresponding element in the array is set to one. After all digital words in the segment have been examined, the elements in the array are examined to find one that is still set to zero. Each zero-valued element in the array corresponds to data patterns that do not occur in the segment.

Actual frequency counts for each data pattern may be calculated but this is not necessary for this method. It is sufficient to merely update each element to show a corresponding data pattern occurs in the original segment.

This method can be made very efficient for small segment lengths by constructing an array with a number of elements that decreases as the segment length decreases. The number of elements may be set equal to the smallest power of two, say $2^B$, that is greater than or equal to the segment length. In this case, only the B most-significant bits of each digital word needs to be examined. After all digital words in the original segment have been examined, a zero-valued array element may be selected and used to determine the B most-significant bits of an unused word. The remaining least-significant bits for the unused data pattern can be set arbitrarily. If desired, these least-significant bits may be set to ones to ensure the unused data pattern is not equal to zero.

This is shown in the following program fragment. This program fragment is expressed in a syntax that includes some syntactical features of the C and BASIC program languages; however, the program fragment can be understood by those who are not familiar with these languages. This program fragment and other program fragments described herein are not intended to be source code segments suitable for compilation but are shown merely to convey a few aspects of possible implementations.

```
(1)  size = ceiling(log2(segment_length));
(2)  initialize array[power(2, size)];
(3)  for j=1 to segment_length {
(4)      read word;
(5)      index = msbits(word, size);
(6)      array[index] = 1;
(7)  }
(8)  index = power(2, size)-1;
(9)  while array[index] ≠ 0
(10)     index = index - 1;
(11) unused_word = left_shift(index, len-size)|1sbits(ones, len-size);
```

The statement in line (1) initializes the integer "size" to the smallest integer power of two that is larger than the segment length. In this statement, the function "log2" returns the base-2 logarithm of the segment length and the function "ceiling" returns the smallest integer that is greater than or equal to this logarithm. The statement in line (2) allocates "array" with a number of elements equal to two raised to the power "size" and initializes each element to a value of zero. The statement in line (3) causes the statements in lines (4) through (6) to reiterate until all digital words in a segment have been examined. The statement in line (4) obtains the next digital word from the segment. The statement in line (5) obtains the "size" most-significant bits of this digital word and converts these bits into a value that is assigned to the variable "index". In this example, it is assumed that each digital word has a number of bits equal to "len". The statement in line (6) ensures the element of "array" that corresponds to this "index" value is set to one. After all digital words in the segment have been examined, the statements in lines (8) through (10) find an element of "array" that has a value of zero and sets "index" equal to the number of this element. The statement in line (11) constructs a non-zero unused data pattern by shifting the value of "index" into the most-significant bits of a digital word and performing a bit-wise OR with the "(len-size)" number of least-significant bits of this value and an appropriate number of bits having the value of one.

As an example, if an original segment comprises 16-bit digital words and the segment length is 2002, the smallest power of two that is greater than or equal to the segment length is 211 or 2048. An array of 2048 elements is constructed and updated as the eleven most-significant bits of each digital word in the segment is examined. For example, the two data patterns 0x0000 and 0x001F, expressed in hexadecimal notation, would both cause the first element in the array to be updated because the eleven most-significant bits of both data patterns are the same. In this example, the eleven most-significant bits of both data patterns are all zero. Continuing the example, if the second element of the array indicates no corresponding data patterns occur in the original segment, then it is known that no digital word in the segment has a data pattern with the ten most-significant bits set to zero and the eleventh most-significant bit set to one. An unused data pattern may be selected from any value in the range from 0x0020 to 0x003F.

If desired, the array can also be examined to determine if any digital word in the segment has the forbidden data pattern. If not, the processing required to perform the encoding operation, such as that shown in equation 1, could be avoided. This condition can be conveyed in the encoded information by setting the coding key to zero. If the exclusive-OR coding process described above is used, a zero-valued key is the normal consequence of choosing the forbidden data pattern as the unused data pattern.

Segment Length

The lengths of the segments may be fixed or they may vary. In one embodiment, the segment length is limited such that each segment contains a number of digital words that is no greater than two less than the number of all possible values such digital words can have. For example, if the information stream comprises 16-bit digital words, there are 216 or 65,536 possible values these data words can have; therefore, the segment length is limited to be less than or equal to 65,534 words. This segment length is convenient because it guarantees at least one non-zero value will not occur in each segment.

Alternatively, variable-length segments may be formed in any of several ways. One way examines each digital word in an information stream, updates an array of elements representing occurrences of respective data patterns, and partitions the information stream into a segment just before the digital word that has the only remaining non-zero unused data pattern in the segment. If desired, the information stream may be partitioned at some earlier location to limit the segment to some maximum length.

Referring to FIG. 4, an embodiment of component 111 may examine the elements of the array used to find an unused data pattern and indicate along path 114 where an information stream should be partitioned.

Another way examines each digital word in an information stream and partitions the stream into a segment just before a digital word that has a forbidden data pattern. If desired, the information stream may be partitioned at some later location to ensure the segment has a least some minimum length. If a segment is known to have no forbidden data patterns, the processing required to perform the encoding operation can be avoided. This can be conveyed in the encoded information by setting the coding key to zero.

One process that can be used to partition an information stream is shown in the following program fragment.

```
(1)  length = 0;
(2)  until end_of_stream {
(3)      length = length + 1;
(4)      read word;
(5)      if word = forbidden_pattern {
(6)          if length ≧ minimum_length {
(7)              signal segment_end;
(8)              length = 1;
(9)          }
(10)     }
(11)     else {
(12)         if length ≧ maximum_length {
(13)             signal segment_end;
(14)             length = 1;
(15)         }
(16)     }
(17)     store word;
(18) }
(19) signal segment_end;
```

The statement in line (1) initializes a variable "length" that counts the number of digital words that are stored in the current segment. The statement in line (2) causes the statements in lines (3) through (17) to reiterate until the end of an input information stream is reached. The statement in line (4) obtains the next digital word from the input information stream. The statement in line (5) determines if this digital word has contents that equal the forbidden data pattern. If so, the statement in line (6) determines if the number of digital words already stored in this segment is large enough to create a segment of at least the minimum permissible length. If the minimum length has been reached, the statements in lines (7) and (8) signal the end of the current segment and reset the digital word counter to begin a new segment. If the digital word does not have contents that equal the forbidden data pattern, the statement in line (12) determines if the number of digital words already stored in the current segment is large enough to create a segment having the maximum permissible length. If the maximum length has been reached, the statements in lines (13) and (14) signal the end of the current segment and reset the digital word counter begin a new segment. The statement in line (17) stores the digital word just read into the current segment. When the end of the information stream is reached, the statement in line (19) signals the end of the current segment, which may have a length that is less than the minimum permissible length.

If the length of segments is allowed to vary, some indication of segment length should be passed with the encoded information so that a companion inverse information processor 5 can correctly recognize the boundary and extent of each encoded segment. Care must be taken to ensure that the indication of segment length does not use a forbidden data pattern.

Multiple Forbidden Data Patterns

This encoding technique can be extended to avoid multiple forbidden data patterns. If the segment length is significantly smaller than the number of all possible values for the digital words, it may be possible to choose a single key that ensures avoidance of two or more forbidden data patterns. For example, if the segment length is less than the square root of the number of all possible values, it is always possible to find a single key word that avoids two forbidden data patterns. This key can be obtained by selecting the most-significant half of the key's bits to avoid the first forbidden data pattern and selecting the least-significant half of the key's bits to avoid the second forbidden data pattern. If the two forbidden data patterns have any bits in common, the segment length can be longer and still guarantee avoiding both forbidden data patterns.

Recovery of the Original Information

Figure 5:
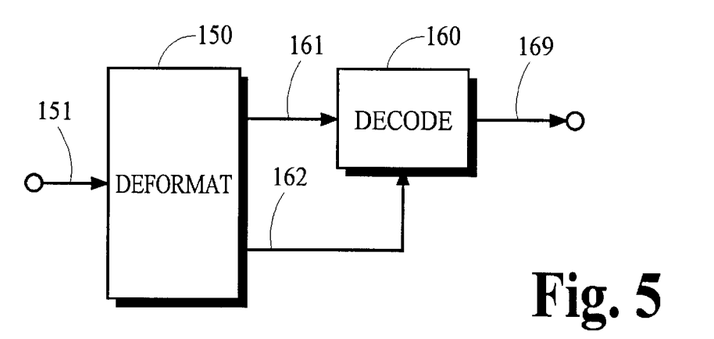
FIG. 5 is a block diagram of an inverse information processor that recovers the original information stream from the encoded information generated by the information processor of FIG. 3.

FIG. 5 is a block diagram of inverse information processor 5 that recovers the original information stream from the encoded information generated by an information processor 3 such as that shown in FIG. 3. Deformat 150 receives an input signal from path 151, extracts encoded segments and decoding keys from the input signal, and passes the encoded segments along path 161 and the decoding keys along path 162. In this context, the term "extract" as used here and elsewhere in this description refers generally to deformatting and/or derivation processes that obtain information from what is conveyed by the input signal. Decode 160 applies a decoding process to the encoded segments according to the respective decoding keys. The decoded segments that result from the decoding process are passed along path 169.

If the decoding process applied by decode 160 is complementary to the encoding process used to generate the encoded information, the decoded segments will contain the same information that was conveyed in corresponding segments of the original information stream. In one embodiment, decode 160 carries out the decoding process by performing exclusive-OR operations as shown above in equation 2.

If desired, a zero-valued key can indicate no decoding is required. As explained above, this situation is the normal result when using the exclusive-OR coding process.

If variable-length segments are permitted, deformat 150 also extracts from the input signal whatever is needed to identify the length and boundary of each segment.

Preferably, the decoding key and any needed indication of segment boundary are assembled ahead of the corresponding encoded segment so that the decoding operation may be performed as each encoded segment is obtained from the encoded information.

Substitution Technique With Unused Data Patterns

Figure 6:
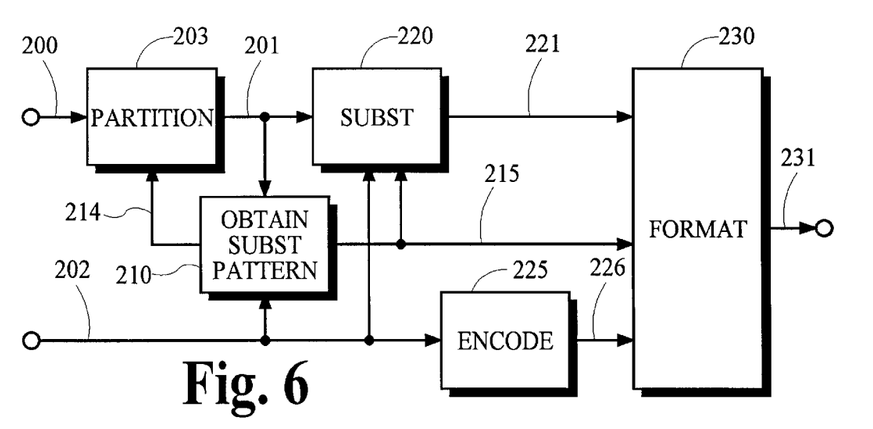
FIG. 6 is a block diagram of an information processor that identifies a substitution data pattern that does not appear in a segment of an information stream, replaces occurrences of a forbidden data pattern with the substitution data pattern to generate encoded information, and assembles the substitution data pattern and the encoded information into output information.

FIG. 6 illustrates major components for another embodiment of information processor 3 that avoids forbidden data patterns by substituting permitted but unused data patterns for the forbidden data patterns. This may be accomplished by partitioning the information stream into segments, identifying an unused data pattern in a respective segment, and carrying out the replacement of all occurrences of the forbidden data pattern in that segment.

Referring to FIG. 6, partition 203 receives an information stream from path 200 and partitions the stream into segments that are passed along path 201. Obtain substitution pattern 210 analyzes the contents of a respective segment and identifies a suitable substitution data pattern for that segment. The substitution data pattern is passed along path 215. Substitute 220 examines the segment and replaces each digital word that has the forbidden data pattern, received from path 202, with another digital word that has the substitution data pattern. The substitution data pattern and the modified segment that results from the substitution operation are passed to format 230, which assembles them into encoded information that has a form suitable for transmission or storage. In this context, the term "encoded" as used here and elsewhere in this description refers generally to processes that convert information from one form into another.

If the forbidden data pattern is not known to the inverse information processor, a representation of this pattern must be assembled as well. The forbidden data pattern itself cannot be assembled with the modified segment; therefore, a representation of it is generated by encode 225 and passed along path 226 to format 230. The process used to generate the representation is not critical and can be carried out in a variety of ways. For example, the representation can be generated by inverting all or selected bits in the forbidden data pattern, or the representation may be an index into a table of possible forbidden data patterns. The representation process need only satisfy two requirements. First, it must somehow convey the forbidden data pattern to an inverse information processor and the representation itself cannot equal any forbidden data pattern.

Alternatively, the substitution data pattern and/or the forbidden data pattern may be conveyed one or more times as an initialization parameter in the encoded information generated by format 230 and need not be conveyed with every segment.

Substitution Data Pattern

Figure 7:
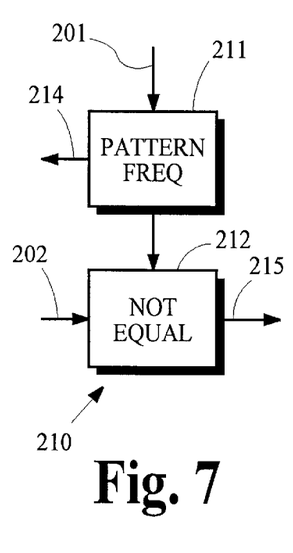
FIG. 7 is a block diagram of a component for identifying a substitution data pattern that is suitable for use in the information processor of FIG. 6.

One embodiment for a component that can identify a substitution data pattern is shown in FIG. 7. Component 211 forms an array that indicates whether particular data patterns occur in the segment, and passes the array to component 212. Component 212 uses the array to select a data pattern U that does not occur in the segment, and compares the selected unused data pattern with the forbidden data pattern F received from path 202. If the selected unused data pattern equals the forbidden data pattern, component 212 uses the array to select another unused data pattern until an unused data pattern is selected that does not equal the forbidden data pattern. If the two patterns are not equal, component 212 passes the selected unused data pattern along path 215 as the substitution data pattern.

Methods for finding unused data patterns are discussed above. A zero-valued substitution data pattern can be used without difficulty provided the zero-value is not a forbidden data pattern. If desired, the array can be examined to determine if any digital word in the segment has the forbidden data pattern. If not, the substitution operation described can be avoided. This condition can be conveyed by a reserved data pattern such as zero value. This reserved value must be known to the inverse information processor and cannot be used as a substitution data pattern.

Segment Length

The lengths of segments may be fixed or they may vary, as discussed above. The requirements for this substitution technique differ slightly because the segment must be partitioned so that at least one unused data pattern can be found that does not equal the forbidden data pattern.

Referring to FIG. 7, an embodiment of component 211 may examine the elements of the array used to find an unused data pattern and indicate along path 214 where an information stream should be partitioned.

Multiple Forbidden Data Patterns

This substitution technique can be extended to avoid multiple forbidden data patterns by finding a different unused data pattern for each forbidden data pattern. In this situation, each unused data pattern must be assembled by format 230. The forbidden data patterns that correspond to each substitution data pattern must also be conveyed to the inverse information processor. This may be accomplished by assembling substitution data patterns together with a representation of the corresponding forbidden data patterns or, if the forbidden data patterns are known to the inverse information processor a priori, the correspondence can be conveyed implicitly by assembling a substitution data pattern for each forbidden data pattern in a prescribed order. If desired, the absence of a particular forbidden data pattern in a segment can be conveyed by assembling a zero-valued substitution data pattern for that particular forbidden data pattern.

As mentioned above, the forbidden data patterns themselves cannot be conveyed directly to the inverse information processor; therefore, alternative representations must be conveyed instead. These representations are generated by encode 225.

Recovery of the Original Information

Figure 8:
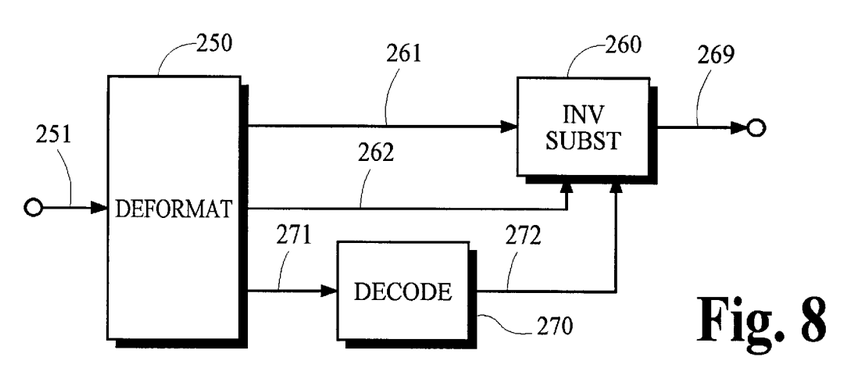
FIG. 8 is a block diagram of an inverse information processor that recovers the original information stream from the encoded information generated by the information processor of FIG. 6.

FIG. 8 is a block diagram of inverse information processor 5 that recovers the original information stream from the encoded information generated by an information processor 3 such as that shown in FIG. 6.

Deformat 250 receives an input signal from path 251, extracts modified segments and substitution data patterns from the input signal, and passes the modified segments along path 261 and the substitution data patterns along path 262. Inverse substitute 260 examines the modified segment and replaces each occurrence of the substitution data pattern with the forbidden data pattern. The segments that result from the inverse substitution process are passed along path 269.

If a representation of the forbidden data pattern is also conveyed by the input signal, format 250 extracts the representation and passes it along path 271 to decode 270, which recovers the forbidden data pattern and passes it along path 272 to inverse substitute 260. The process used to recover the forbidden data pattern reverses the process used to generate the representation.

In some embodiments, a zero-valued substitution data pattern is used to indicate that no digital words in the original segment had the forbidden data pattern. In these embodiments, if the substitution data pattern received from path 262 is zero, inverse substitute 260 need not examine the digital words in the received segment but can pass this segment unchanged along path 269.

If variable-length segments are permitted, deformat 250 also extracts from the input signal whatever is needed to identify the length and boundary of each segment.

Preferably, the substitution data pattern and any needed indication of segment boundary are assembled ahead of the corresponding modified segment so that the inverse substitution operation may be performed as each modified segment is received.

Substitution Technique With Replacement Flags

Figure 9:
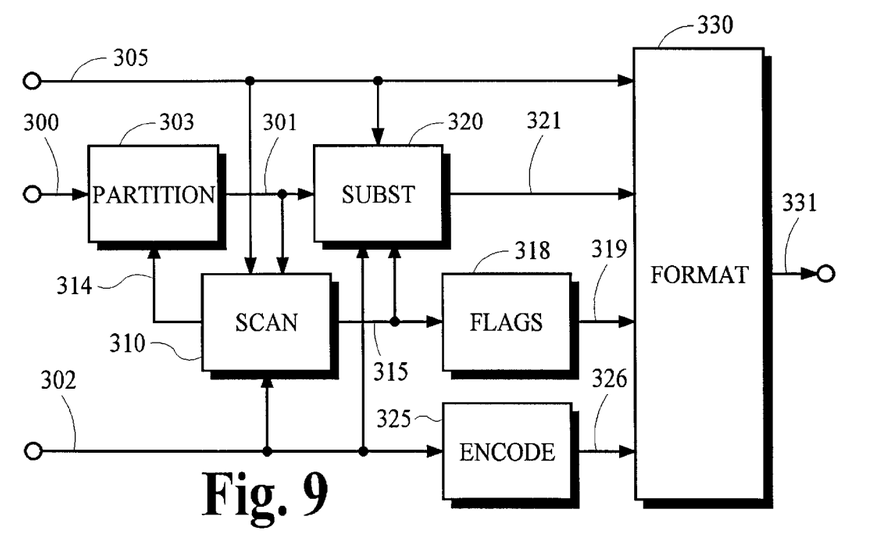
FIG. 9 is a block diagram of an information processor that obtains a substitution data pattern, replaces occurrences of a forbidden data pattern with the substitution data pattern to generate encoded information, constructs a set of flags indicating how the substitution data pattern is used in the encoded information, and assembles the set of flags and the encoded information into output information.

FIG. 9 illustrates major components for another embodiment of information processor 3 that avoids forbidden data patterns by substituting a permitted data pattern for the forbidden data pattern and constructing flags that indicate whether an occurrence of the substituted data pattern occurred in the original information stream or is a substitution for the forbidden data pattern. This may be accomplished by partitioning the information stream into segments, identifying occurrences of the substitution data pattern and the forbidden data pattern in a respective segment, constructing a flag for each occurrence, and replacing all occurrences of the forbidden data pattern in that segment with the substitution data pattern. The set of flags must be conveyed in a form that does not equal the forbidden data pattern. This may be accomplished by padding the set of flags with bits that have appropriate values that ensure the set of flags cannot equal the forbidden data pattern.

Referring to FIG. 9, partition 303 receives an information stream from path 300 and partitions the stream into segments that are passed along path 301. Scan 310 analyzes the contents of a respective segment, identifies occurrences of a substitution data pattern received from path 305 and a forbidden data pattern received from path 302, and passes an indication of these occurrences along path 315. Flags 318 constructs a set of flags that is passed along path 319. The first flag in the set corresponds to the first occurrence of either the substitution data pattern or the forbidden data pattern and indicates which pattern it is. For example, a flag equal to 1 indicates an occurrence of the forbidden data pattern and a flag equal to 0 indicates an occurrence of the substitution data pattern. Substitute 320 responds to the indications received from path 315 and replaces each digital word that has the forbidden data pattern, received from path 302, with another digital word that has the substitution data pattern, received from path 305. The set of flags and the modified segment that results from the substitution operation are passed to format 330, which assembles this information into a form that is suitable for transmission or storage.

If the substitution data pattern is not known to the inverse information processor, format 330 receives that pattern from path 305 and assembles it with the flags and the modified segment.

If the forbidden data pattern is not known to the inverse information processor, a representation of this pattern must be assembled as well. The forbidden data pattern itself cannot be assembled with the modified segment; therefore, a representation of it is generated by encode 325 and passed along path 326 to format 330. The process used to generate the representation is not critical and can be carried out in a variety of ways, as described above.

Alternatively, the substitution data pattern and/or the forbidden data pattern may be conveyed one or more times as an initialization parameter and need not be conveyed with every segment.

Replacement Flags

A set of flags can be constructed in a wide variety of ways. In one embodiment, each flag is a single bit that can assume one of only two possible values. In other embodiments, multiple-bit flags can assume one of several values. One process that can be used to construct a set of binary flags for a segment is shown in the following program fragment.

```
(1)  i = 0;
(2)  for j=1 to segm_length {
(3)      read word;
(4)      if word = forbidden_pattern {
(5)          flags[i] = 1;
(6)          i = i + 1;
(7)          word = substitute_pattern;
(8)      }
(9)      else {
(10)         if word = substitute_pattern {
(11)             flags[i] = 0;
(12)             i = i + 1;
(13)         }
(14)     }
(15)     store word;
(16) }
(17) pad flags;
(18) write flags;
(19) write word_buffer;
```

The statement in line (1) initializes the index "i" for an array "flags". The statement in line (2) causes the statements in lines (3) through (15) to reiterate for each digital word in the segment. The statement in line (3) obtains the next digital word from the input information stream. The statement in line (4) determines if this digital word has contents that are equal to the forbidden data pattern. If so, the statements in lines (5) through (7) set a corresponding element in the flag array to one and modify the digital word so that it contains the substitution data pattern. If not, the statement in line (10) determines if this digital word has contents that are equal to the substitution data pattern. If so, the statements in lines (11) and (12) set a corresponding element in the flag array to zero. The statement in line (15) stores the digital word, possibly modified to contain the substitution data pattern, into a buffer. After all digital words in the segment have been examined, the statement in line (17) pads the "flags" array as needed with bits having appropriate values to ensure it does not equal the forbidden data pattern, and the statements in lines (18) and (19) generate a segment of encoded information by writing the "flags" array and the digital words stored in the buffer.

Substitution Data Pattern

In one embodiment, the substitution data pattern is known apriori and need not be identified dynamically as is described above for the substitution technique with unused data patterns. In other embodiments, however, the substitution data pattern is identified dynamically to minimize the number of substitutions that must be made in each segment and/or to guarantee that the number of substitutions do not exceed some threshold number. This may be carried out using a device similar to that shown in FIG. 7.

Segment Length

The lengths of segments may be fixed or they may vary. This substitution technique does not require any unused data patterns in a segment but, preferably, will ensure the total number of digital words in each modified segment that have the substitution data pattern does not exceed the number of flags generated for each segment by flags 318. This condition may be accomplished in a number of ways.

One way attempts to maximize the probability of this condition by attempting to ensure the data in the original information stream is random enough that the forbidden data pattern and the substitution data pattern occur infrequently. If, for example, the information stream is assumed to be a sequence of 16-bit digital words that have random values, then the average number of occurrences of forbidden and substitution data patterns is only once in each 32,768 digital words. If the segment is limited to 2002 digital words, the probability of having more than eight digital words with forbidden and/or substitution data patterns in a segment is only $3.04 \times 10^{-17}$. If thirty segments represent one second of information, then the number of occurrences of forbidden/substitution data patterns will exceed the threshold of eight only once every 34.8 million years. If the original information stream is not sufficiently random, a scrambling operation could be applied to the original information prior to forbidden data pattern substitution. The inverse information processor would then reverse the effects of the scrambling after the substitution is reversed.

Another way guarantees the condition is met by partitioning the information stream into variable-length segments such that the number of digital words in each respective segment that have the forbidden and substitution data patterns never exceeds the number of flags for that segment. An indication of the segment length can be assembled with the segment. Various method for partitioning the information stream into variable-length segments are discussed above and these methods can be adapted for use with this substitution technique.

Figure 10:
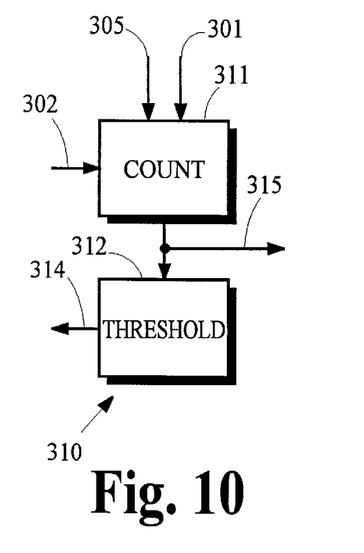
FIG. 10 is a block diagram of a device that may be used in t he information processor of FIG. 9 to partition an information stream into segments.

FIG. 10 illustrates a device that may be used to control the partitioning of variable-length segments. Component 311 examines each digital word in an information stream and counts the number of digital words that have the forbidden data pattern, received from path 302, and the substitution data pattern, received from path 305. An indication of each occurrence is passed along path 315 to substitute 320 and flags 318. When this count reaches a threshold number, component 312 indicates along path 314 that the information stream should be partitioned into a segment and component 311 resets the counter to zero for the next segment.

Yet another way guarantees the condition is met by generating a variable number of flags for each segment and passing an indication of the number of flags to format 330.

Multiple Forbidden Data Patterns

This substitution technique can be extended to avoid multiple forbidden data patterns by using a different substitution data pattern for each forbidden data pattern in conjunction with a single set of flags. In this case, each substitution data pattern and a representation of each corresponding forbidden data pattern must be passed to format 330 for assembly with the encoded information unless these patterns and their correspondence are known a priori to inverse information processor 5.

Alternatively, a single substitution data pattern can be used to replace multiple forbidden data patterns by constructing a single set of flags that indicate which forbidden data pattern has been replaced. In this case, a representation of each forbidden data pattern and its correspondence with the flags must be passed to format 330 for assembly with the modified segment unless these patterns and their correspondence to the flags are known a priori to inverse information processor 5. For example, a set of 2-bit flags could convey the following: 00 indicates the substitution data pattern occurred in the original information stream, 01 indicates the substitution data pattern replaces a first forbidden data pattern, 10 indicates the substitution data pattern replaces a second forbidden data pattern, and 11 indicates the substitution data pattern replaces a third forbidden data pattern.

In another alternative, a distinct substitution data pattern and a distinct set of flags may be established for each forbidden data pattern. A representation of the respective forbidden data pattern must be passed to format 330 for assembly with the modified segment unless these patterns and their correspondence to the sets of flags are known a priori to inverse information processor 5.

As mentioned above, the forbidden data patterns themselves cannot be conveyed directly to the inverse information processor; therefore, alternative representations must be conveyed instead. These representations are generated by encode 325. Furthermore, the one of more sets of flags must be conveyed in a manner that does not equal any of the forbidden data patterns.

Recovery of the Original Information

Figure 11:
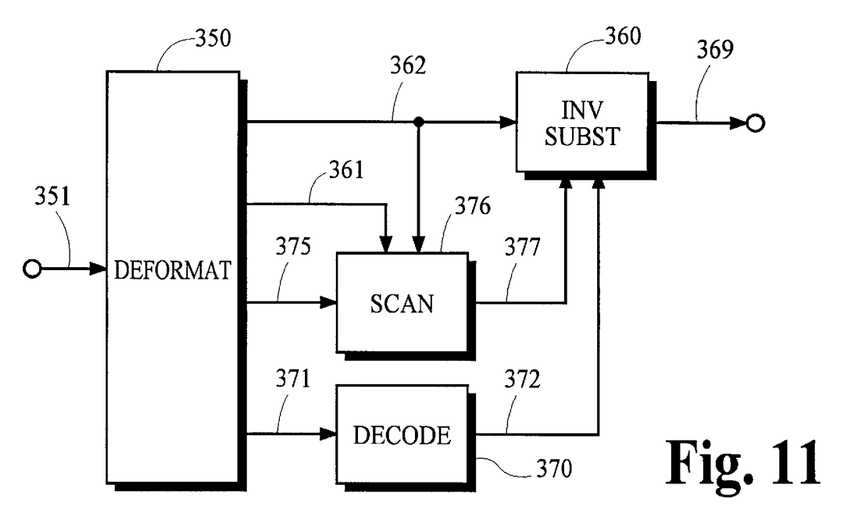
FIG. 11 is a block diagram of inverse information processor that recovers the original information stream from the encoded information generated by the information processor of FIG. 9.

FIG. 11 is a block diagram of inverse information processor 5 that recovers the original information stream from the information generated by an information processor 3 such as that shown in FIG. 9.

Deformat 350 receives an input signal from path 351, extracts modified segments and a set of flags from the input signal, passes the modified segments along path 362 to inverse substitute 360 and to scan 376, and passes the set of flags along path 375 to scan 376. Scan 376 examines the modified segment and the set of flags to find occurrences of the substitution data pattern, received from path 361, and generates along path 377 an indication of which digital words having substitution data patterns should be replaced by digital words having the forbidden data pattern. Inverse substitution 360 receives the indications from path 377 and replaces indicated occurrences of the substitution data pattern with the forbidden data pattern, received from path 372. The segments that result from the inverse substitution process are passed along path 369.

If the substitution data pattern is conveyed with the encoded information, format 350 extracts this pattern and passes it along path 361 to scan 376.

If a representation of the forbidden data pattern is conveyed with the encoded information, format 350 extracts the representation and passes it along path 371 to decode 370, which recovers the forbidden data pattern and passes it along path 372 to inverse substitute 360. The process used to recover the forbidden data pattern reverses the process used to generate the representation.

In this embodiment, if all flags in a set of flags for a respective segment are equal to zero, no inverse substitution is required for that segment and it can be passed to path 369 without change.

If variable-length segments are permitted, deformat 350 also extracts from the encoded information whatever is needed to identify the length and boundary of each segment.

Preferably, the flags and any needed indication of segment boundary are assembled ahead of the corresponding modified segment so that the inverse substitution operation may be performed as each modified segment is received.

What is claimed is:

1. A method for processing digital information to avoid a forbidden data pattern, wherein the method comprises:
   receiving a segment of the digital information that comprises digital words,
   obtaining an encoding key to control an encoding process, wherein the encoding key is such that the encoding process applied to each digital word in the segment produces a result that is unequal to the forbidden data pattern,
   applying the encoding process to the digital words in the segment to generate encoded information, wherein the encoding process is applied in a manner controlled by the encoding key, and
   assembling key information and the encoded information into a form that is suitable for transmission or storage, wherein the key information is unequal to the forbidden data pattern and is such that a decoding key for a decoding process complementary to the encoding process may be obtained therefrom.

2. A method according to claim 1 that comprises partitioning the digital information to obtain the segment of digital words such that the segment contains no more than a threshold number of digital words, wherein the threshold number is less than a count of all possible values of the digital words.

3. A method according to claim 1 that comprises partitioning the digital information to obtain the segment of digital words such that at least a threshold number of different data patterns do not occur in any digital words in the segment.

4. A method according to claim 1 that comprises partitioning the digital information at a location before a digital word having the forbidden data pattern to obtain the segment of digital words such that no digital word in the segment has the forbidden data pattern.

5. A method according to claim 1 that obtains the encoding key from a Boolean exclusive-or of the forbidden data pattern and a non-zero data pattern that does not occur in the segment, and generates the encoded information from a Boolean exclusive-or of the encoding key and the digital words in the segment.

6. A method according to claim 5 that obtains the data patterns that do not occur in the segment by forming an array of values representing frequencies of occurrence in the segment for respective data patterns and selecting one or more non-zero data patterns having a zero frequency of occurrence.

7. A method for processing information to recover a forbidden data pattern, wherein the method comprises:
   receiving a segment of information that comprises digital words and key information, and extracting from the key information a decoding key to control a decoding process,
   applying the decoding process to the digital words in the segment to generate decoded information, wherein the decoding process is applied in a manner controlled by the decoding key to recover one or more digital words having the forbidden data pattern, and
   generating an output signal from the decoded information.

8. A method for processing digital information to avoid a forbidden data pattern, wherein the method comprises:
   receiving a segment of the digital information that comprises digital words,
   obtaining a substitution data pattern that is unequal to the forbidden data pattern and does not occur in the segment,
   replacing each digital word in the segment having the forbidden data pattern with a substitute digital word having the substitution data pattern, and
   assembling the substitution data pattern and the segment with substitute digital words into a form that is suitable for transmission or storage.

9. A method according to claim 8 that comprises partitioning the digital information to obtain the segment of digital words such that the segment contains no more than a threshold number of digital words, wherein the threshold number is less than a count of all possible values of the digital words.

10. A method according to claim 8 that comprises partitioning the digital information to obtain the segment of digital words such that at least a threshold number of different data patterns do not occur in any digital words in the segment.

11. A method according to claim 8 that comprises partitioning the digital information at a location before a digital word having the forbidden data pattern to obtain the segment of digital words such that no digital word in the segment has the forbidden data pattern.

12. A method according to claim 8 for processing digital information to avoid one or more forbidden data patterns, wherein the method obtains a respective substitution data pattern for each respective forbidden data pattern occurring in the segment, replaces each digital word having the respective forbidden data pattern with the respective substitution data pattern, and assembles representations of respective forbidden data patterns with respective substitution data patterns, wherein the representations are unequal to the one or more forbidden data patterns.

13. A method according to claim 8 that obtains the substitution data pattern by forming an array of values representing frequencies of occurrence in the segment for respective data patterns and selecting a data pattern having a zero frequency of occurrence.

14. A method for processing information to recover a forbidden data pattern, wherein the method comprises:
   receiving a segment of information that comprises digital words and control information, and extracting a substitution data pattern from the control information,
   replacing each digital word in the segment having the substitution data pattern with a substitute digital word having the forbidden data pattern, and
   generating an output signal from the segment with substitute digital words.

15. A method according to claim 14 for processing information to recover one of more forbidden data patterns, wherein the method comprises extracting from the control information one or more substitution data patterns and one or more representations of forbidden data patterns, wherein the one or more representations are unequal to the one or more forbidden data patterns, and deriving one or more of the forbidden data patterns from the one or more representations of forbidden data patterns, wherein a respective substitution data pattern has a corresponding derived forbidden data pattern, and wherein the method replaces each digital word in the segment having a respective substitution data pattern with the corresponding derived forbidden data pattern.

16. A method for processing digital information to avoid a forbidden data pattern, wherein the method comprises:

receiving a segment of the digital information that comprises digital words, constructing a set of flags, wherein each flag in the set corresponds to a respective digital word in the segment having either the forbidden data pattern or a substitution data pattern, and wherein each flag in the set indicates whether the respective digital word has the forbidden data pattern or the substitution data pattern, replacing each digital word in the segment having the forbidden data pattern with a substitute digital word having the substitution data pattern, and assembling the set of flags and the segment with substitute digital words into a form that is suitable for transmission or storage.

17. A method according to claim 16 for processing digital information to avoid one or more forbidden data patterns, wherein the method comprises partitioning the digital information to obtain the segment of digital words such that the segment contains no more than a threshold number of digital words having one of the one or more forbidden data patterns.

18. A method according to claim 16 that comprises partitioning the digital information at a location before a digital word having the forbidden data pattern to obtain the segment of digital words such that no digital word in the segment has the forbidden data pattern.

19. A method according to claim 16 for processing digital information to avoid one or more forbidden data patterns, wherein the method comprises:

obtaining one or more substitution data patterns, wherein a respective substitution data pattern is obtained for each respective forbidden data pattern occurring in the segment, and partitioning the digital information to obtain the segment of digital words such that the segment contains fewer than a threshold number of digital words having either one of the one or more forbidden data pattern or the one of the one or more substitution data patterns.

20. A method according to claim 16 for processing digital information to avoid a plurality of forbidden data patterns, wherein the method comprises obtaining a plurality of substitution data patterns, wherein a respective substitution data pattern is obtained for each respective forbidden data pattern occurring in the segment, and wherein a respective set of flags is constructed for a respective forbidden data pattern and a respective substitution data pattern.

21. A method according to claim 20 that assembles a representation of the respective forbidden data pattern with the respective set of flags, wherein the representation itself is unequal to the one or more forbidden data patterns.

22. A method according to claim 20 that assembles a representation of the respective substitution data pattern with the respective set of flags.

23. A method for processing information to recover a forbidden data pattern, wherein the method comprises:

receiving a segment of information that comprises digital words and control information, and extracting a set of flags from the control information, wherein each flag corresponds to a respective digital word in the segment having a substitution data pattern and wherein each flag indicates whether the respective digital word should have the forbidden data pattern or the substitution data pattern, replacing with digital words having the forbidden data pattern those respective digital words in the segment that have the substitution data pattern and that correspond to a respective flag indicating the respective digital word should have the forbidden data pattern, and generating an output signal from the segment with substitute digital words.

24. A method according to claim 23 for processing information to recover a plurality of forbidden data patterns, wherein the method comprises extracting one or more sets of flags from the control information and obtaining one or more substitution data patterns, wherein a respective substitution data pattern corresponds to a respective forbidden data pattern to be recovered, and wherein a respective set of flags corresponds to a respective forbidden data pattern and a respective substitution data pattern.

25. A method according to claim 24 that comprises extracting from the control information one or more representations of forbidden data patterns, wherein the one or more representations are unequal to the one or more forbidden data patterns, and deriving respective forbidden data patterns from the one or more representations.

26. A method according to claim 24 that comprises extracting from the control information one or more substitution data patterns.

27. A method for processing digital information to avoid one or more forbidden data patterns, wherein the method comprises:

receiving the digital information, wherein the digital information comprises a plurality of digital words, partitioning the digital information at a location before a digital word having any of the forbidden data patterns to obtain a first segment of digital words prior to the location having no digital word with any forbidden data pattern and a second segment of digital words after the location having one or more digital words with one of the forbidden data patterns, processing the second segment of digital words to obtain a modified segment that contains no digital words with any of the forbidden data patterns, and assembling control information with the modified segment into a form that is suitable for transmission or storage, wherein the control information indicates how the second segment may be recovered from the modified segment.

28. An apparatus for processing digital information to avoid a forbidden data pattern, wherein the apparatus comprises:

means for receiving a segment of the digital information that comprises digital words, means for obtaining an encoding key to control an encoding process, wherein the encoding key is such that the encoding process applied to each digital word in the segment produces a result that is unequal to the forbidden data pattern, means for applying the encoding process to the digital words in the segment to generate encoded information, wherein the encoding process is applied in a manner controlled by the encoding key, and means for assembling key information and the encoded information into a form that is suitable for transmission or storage, wherein the key information is unequal to the forbidden data pattern and is such that a decoding key for a decoding process complementary to the encoding process may be obtained therefrom.

29. An apparatus according to claim 28 that comprises means for partitioning the digital information to obtain the segment of digital words such that the segment contains no more than a threshold number of digital words, wherein the threshold number is less than a count of all possible values of the digital words.

30. An apparatus according to claim 28 that comprises means for partitioning the digital information to obtain the segment of digital words such that at least a threshold number of different data patterns do not occur in any digital words in the segment.

31. An apparatus according to claim 28 that comprises means for partitioning the digital information at a location before a digital word having the forbidden data pattern to obtain the segment of digital words such that no digital word in the segment has the forbidden data pattern.

32. An apparatus according to claim 28 that obtains the encoding key from a Boolean exclusive-or of the forbidden data pattern and a non-zero data pattern that does not occur in the segment, and generates the encoded information from a Boolean exclusive-or of the encoding key and the digital words in the segment.

33. An apparatus according to claim 32 that obtains the data patterns that do not occur in the segment by forming an array of values representing frequencies of occurrence in the segment for respective data patterns and selecting one or more non-zero data patterns having a zero frequency of occurrence.

34. An apparatus for processing information to recover a forbidden data pattern, wherein the apparatus comprises:

means for receiving a segment of information that comprises digital words and key information, and extracting from the key information a decoding key to control a decoding process, means for applying the decoding process to the digital words in the segment to generate decoded information, wherein the decoding process is applied in a manner controlled by the decoding key to recover one or more digital words having the forbidden data pattern, and means for generating an output signal from the decoded information.

35. An apparatus for processing digital information to avoid a forbidden data pattern, wherein the apparatus comprises:

means for receiving a segment of the digital information that comprises digital words, means for obtaining a substitution data pattern that is unequal to the forbidden data pattern and does not occur in the segment, means for replacing each digital word in the segment having the forbidden data pattern with a substitute digital word having the substitution data pattern, and means for assembling the substitution data pattern and the segment with substitute digital words into a form that is suitable for transmission or storage.

36. An apparatus according to claim 35 that comprises means for partitioning the digital information to obtain the segment of digital words such that the segment contains no more than a threshold number of digital words, wherein the threshold number is less than a count of all possible values of the digital words.

37. An apparatus according to claim 35 that comprises means for partitioning the digital information to obtain the segment of digital words such that at least a threshold number of different data patterns do not occur in any digital words in the segment.

38. An apparatus according to claim 35 that comprises means for partitioning the digital information at a location before a digital word having the forbidden data pattern to obtain the segment of digital words such that no digital word in the segment has the forbidden data pattern.

39. An apparatus according to claim 35 for processing digital information to avoid one or more forbidden data patterns, wherein the apparatus obtains a respective substitution data pattern for each respective forbidden data pattern occurring in the segment, replaces each digital word having the respective forbidden data pattern with the respective substitution data pattern, and assembles representations of respective forbidden data patterns with respective substitution data patterns, wherein the representations are unequal to the one or more forbidden data patterns.

40. An apparatus according to claim 35 that obtains the substitution data pattern by forming an array of values representing frequencies of occurrence in the segment for respective data patterns and selecting a data pattern having a zero frequency of occurrence.

41. An apparatus for processing information to recover a forbidden data pattern, wherein the apparatus comprises:

means for receiving a segment of information that comprises digital words and control information, and for extracting a substitution data pattern from the control information, means for replacing each digital word in the segment having the substitution data pattern with a substitute digital word having the forbidden data pattern, and means for generating an output signal from the segment with substitute digital words.

42. An apparatus according to claim 41 for processing information to recover one of more forbidden data patterns, wherein the apparatus comprises means for extracting from the control information one or more substitution data patterns and one or more representations of forbidden data patterns, wherein the one or more representations are unequal to the one or more forbidden data patterns, and means for deriving one or more of the forbidden data patterns from the one or more representations of forbidden data patterns, wherein a respective substitution data pattern has a corresponding derived forbidden data pattern, and wherein the apparatus replaces each digital word in the segment having a respective substitution data pattern with the corresponding derived forbidden data pattern.

43. An apparatus for processing digital information to avoid a forbidden data pattern, wherein the apparatus comprises:

means for receiving a segment of the digital information that comprises digital words, means for constructing a set of flags, wherein each flag in the set corresponds to a respective digital word in the segment having either the forbidden data pattern or a substitution data pattern, and wherein each flag in the set indicates whether the respective digital word has the forbidden data pattern or the substitution data pattern, means for replacing each digital word in the segment having the forbidden data pattern with a substitute digital word having the substitution data pattern, and means for assembling the set of flags and the segment with substitute digital words into a form that is suitable for transmission or storage.

44. An apparatus according to claim 43 for processing digital information to avoid one or more forbidden data patterns, wherein the apparatus comprises means for partitioning the digital information to obtain the segment of digital words such that the segment contains no more than a threshold number of digital words having one of the one or more forbidden data patterns.

45. An apparatus according to claim 43 that comprises means for partitioning the digital information at a location before a digital word having the forbidden data pattern to obtain the segment of digital words such that no digital word in the segment has the forbidden data pattern.

46. An apparatus according to claim 43 for processing digital information to avoid one or more forbidden data patterns, wherein the apparatus comprises:

means for obtaining one or more substitution data patterns, wherein a respective substitution data pattern is obtained for each respective forbidden data pattern occurring in the segment, and means for partitioning the digital information to obtain the segment of digital words such that the segment contains fewer than a threshold number of digital words having either one of the one or more forbidden data pattern or the one of the one or more substitution data patterns.

47. An apparatus according to claim 43 for processing digital information to avoid a plurality of forbidden data patterns, wherein the apparatus comprises means for obtaining a plurality of substitution data patterns, wherein a respective substitution data pattern is obtained for each respective forbidden data pattern occurring in the segment, and wherein a respective set of flags is constructed for a respective forbidden data pattern and a respective substitution data pattern.

48. An apparatus according to claim 47 that assembles a representation of the respective forbidden data pattern with the respective set of flags, wherein the representation itself is unequal to the one or more forbidden data patterns.

49. An apparatus according to claim 47 that assembles a representation of the respective substitution data pattern with the respective set of flags.

50. An apparatus for processing information to recover a forbidden data pattern, wherein the apparatus comprises:

means for receiving a segment of information that comprises digital words and control information, and extracting a set of flags from the control information, wherein each flag corresponds to a respective digital word in the segment having a substitution data pattern and wherein each flag indicates whether the respective digital word should have the forbidden data pattern or the substitution data pattern, means for replacing with digital words having the forbidden data pattern those respective digital words in the segment that have the substitution data pattern and that correspond to a respective flag indicating the respective digital word should have the forbidden data pattern, and means for generating an output signal from the segment with substitute digital words.

51. An apparatus according to claim 50 for processing information to recover a plurality of forbidden data patterns, wherein the apparatus comprises means for extracting one or more sets of flags from the control information and obtaining one or more substitution data patterns, wherein a respective substitution data pattern corresponds to a respective forbidden data pattern to be recovered, and wherein a respective set of flags corresponds to a respective forbidden data pattern and a respective substitution data pattern.

52. An apparatus according to claim 51 that comprises means for extracting from the control information one or more representations of forbidden data patterns, wherein the one or more representations are unequal to the one or more forbidden data patterns, and deriving respective forbidden data patterns from the one or more representations.

53. An apparatus according to claim 51 that comprises means for extracting from the control information one or more substitution data patterns.

54. An apparatus for processing digital information to avoid one or more forbidden data patterns, wherein the apparatus comprises:

means for receiving the digital information, wherein the digital information comprises a plurality of digital words, means for partitioning the digital information at a location before a digital word having any of the forbidden data patterns to obtain a first segment of digital words prior to the location having no digital word with any forbidden data pattern and a second segment of digital words after the location having one or more digital words with one of the forbidden data patterns, means for processing the second segment of digital words to obtain a modified segment that contains no digital words with any of the forbidden data patterns, and means for assembling control information with the modified segment into a form that is suitable for transmission or storage, wherein the control information indicates how the second segment may be recovered from the modified segment.

* * * * *